Sept. 5, 1950 R. V. LINDNER ET AL 2,521,070
OSCILLATION GENERATOR
Filed May 31, 1946
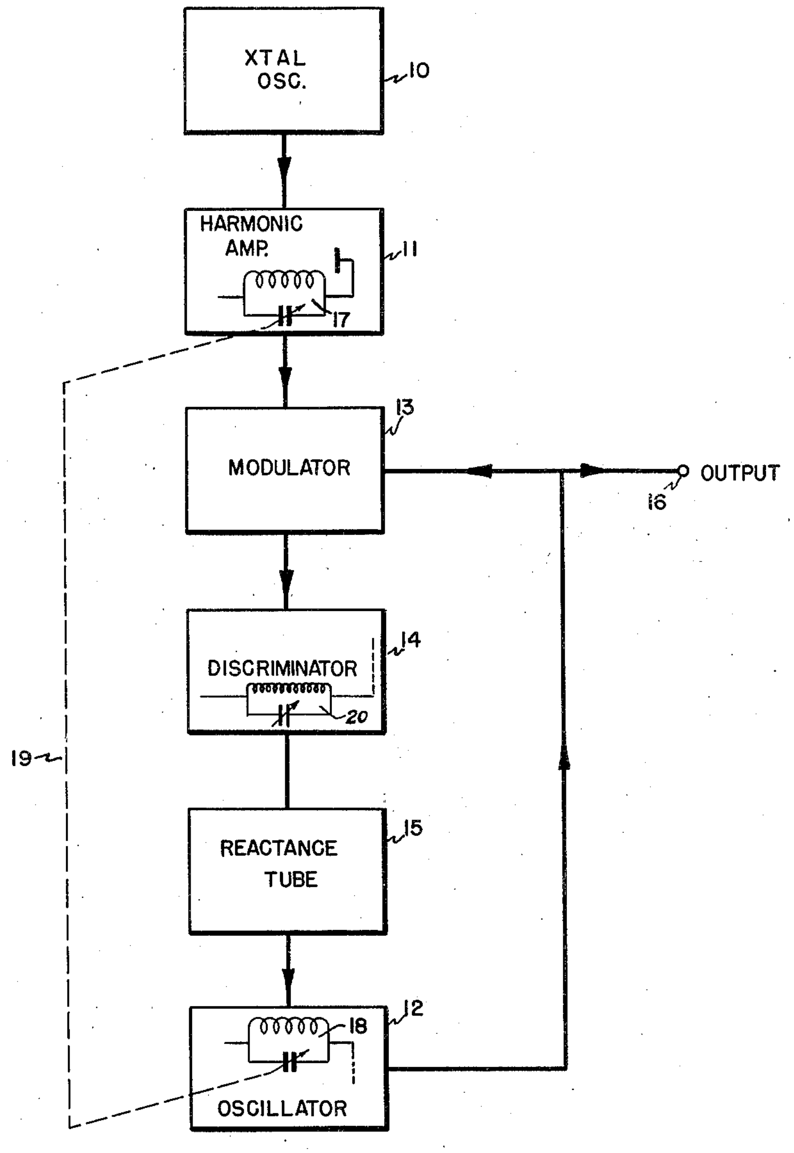
Inventors
R.VERNON LINDNER, and
ROBERT B. EDWARDS
By Robert T. Killman
Attorney Patented Sept. 5, 1950 2,521,070

UNITED STATES PATENT OFFICE 2,521,070

OSCILLATION GENERATOR

Ralph Vernon Lindner and Robert B. Edwards, Baltimore, Md., assignors to Bendix Aviation Corporation, South Bend, Ind., a corporation of Delaware Application May 31, 1946, Serial No. 673,265

4 Claims. (Cl. 250—36)

This invention relates to a radio frequency wave signal generating system and more particularly to a system for deriving from a fixed frequency signal source of high stability a signal controllable in frequency throughout a desired range and having a constancy at any frequency within said range which is equivalent to that of the fixed frequency output of said source.

Frequency stability of the output of a transmitter is normally obtained by the incorporation of a piezo-electric crystal as a frequency control means. This expedient is quite effective in achieving the desired stable output. However, the extreme stability of the crystal, which renders it so effective for this purpose, renders difficult its use to derive a range of frequencies of high constancy.

Frequency stable signals at a series of fixed frequencies have been obtained from the output of a crystal by selecting and utilizing harmonics of its fundamental frequency. Other frequencies, intermediate the crystal harmonics, have been secured by beating the crystal controlled output or its harmonics with the outputs of other sources. However, unless the other sources are themselves crystal controlled the stability of the resulting signals deteriorates. The use of several crystals is undesirable, due to their cost.

It is, therefore, an object of this invention to provide a radio frequency wave signal generator wherein a single crystal exercises accurate control over a continuous band of radio frequencies.

It is another object of this invention to provide a radio frequency wave signal generator having a frequency stable output over a wide frequency range in which the frequency may be selected by adjustment of a single control means.

It is a further object of this invention to provide a stable radio frequency wave signal generator in which any deviation from a desired frequency of output automatically introduces into the generator a frequency restoring factor.

The objects and advantages of the invention are obtained by mixing a desired harmonic of the output of a crystal controlled oscillator with the output of a variable oscillator tuned to a fixed frequency separation from the output of the harmonic of the crystal controlled oscillator, the output of the mixer being applied through a discriminator and a reactive circuit to control the frequency of the variable oscillator.

Other objects and advantages of the invention will become apparent from a consideration of the following specification, when taken in connection with the accompanying drawing, in the single figure of which there is shown a block diagram of a circuit embodying the invention.

Referring now more particularly to the drawing, there is illustrated a crystal oscillator 10, the output of which drives a harmonic amplifier 11. The output of the harmonic amplifier 11 is mixed with the output of a variable oscillator 12 in a mixer or modulator 13. The resultant modulation products are applied to the input circuit of a discriminator 14, the output of which is applied to the control electrode of a reactance tube 15 which, in turn, is connected to the variable oscillator 12 in a manner to control its frequency. A terminal 16 is connected to the output circuit of the oscillator 12 to provide radio frequency output for a utilization circuit.

In operation, the oscillator 10 is driven by a low frequency crystal, at, for example, 200 kc. The harmonic amplifier 11 is provided with a resonant circuit 17 in its output, which may be selective to any one of a plurality of high order harmonics of the crystal frequency, as for example: 10 mc., 10.2 mc., 10.4 mc., 10.6 mc. and so forth.

The discriminator 14 is arranged to be tunable over a comparatively narrow band of frequencies, as for example: 800 to 1000 kc. The oscillator 12 is therefore tuned to a frequency which is 800 to 1000 kc. lower than the output of the harmonic amplifier 11, as for example: 9.2 mc., 9.4 mc., etc. for the 800 kc. setting of the discriminator 14, to 9.0 mc., 9.2 mc., 9.4 mc. for 1000 kc. setting of the discriminator 14. A tuned circuit 20 is shown for the purpose of tuning the discriminator.

The reactance tube 15, in cooperation with the discriminator 14, therefore tends to hold the frequency of the oscillator 12 constant when any one of the above conditions entails.

By ganging the tuning control 17 of the harmonic amplifier 11 and that of the oscillator 12, which latter control is shown as tuned circuit 18, essentially single control selection of the desired output channel may be obtained. The ganging means for this purpose is indicated at 19.

The frequency of the oscillator 12 may be varied through any desired 200 kc. channel by variation of the tuning control of the discriminator 14.

Since the circuit components which are indicated in the drawing in block form are of conventional nature, and the details of their respective circuits form no part of the invention, no detailed showing thereof has been made.

While the disclosure has been limited to a single embodiment of the invention, it is to be understood that the scope of the invention is not intended to be limited thereto, since many variations therefrom falling within the scope of the invention as defined by the appended claims, will become apparent to those skilled in the art.

It will be manifest from the foregoing description that a second range of output frequencies may be obtained by tuning the oscillator 12 to frequencies which are the sum of the resonant frequencies of the amplifier 11 and the discriminator 14, rather than their difference.

What is claimed is:

1. In an oscillation generator: a frequency stable source of wave signal energy; means selecting and amplifying a harmonic of the output of said source; a variable frequency source of such energy; means establishing a substantially constant difference between the frequencies of the outputs of said harmonic selector and said variable frequency source; means mixing the outputs of said harmonic selector and said variable frequency source and deriving therefrom an output having a frequency of their difference; a frequency discriminator tunable over a band of frequencies as wide as the fundamental frequency of said stable source and including the frequency of said difference and having applied thereto the output of said mixing means; and means controlling the frequency of said variable frequency source in accordance with the output of said discriminator.

2. In an oscillation generator of continuously variable frequency stabilized by reference to a source of fixed frequency: a harmonic selector for said source of fixed frequency synchronously tunable with said oscillation generator, a modulator combining the output of said harmonic selector with the output of said oscillation generator and deriving a signal having a frequency equal to the difference in frequency of said combined signals and much lower in value than that of either of said combined signals, a frequency discriminator responsive to said derived signal to produce a control potential corresponding in sense to the direction of deviation of said derived signal and corresponding in amplitude to the extent of said deviation of said derived signal from the frequency to which said frequency discriminator is tuned, said frequency discriminator being tunable over a range at least equal to the frequency of said source of fixed frequency, and means controlling the frequency of said oscillation generator in accordance with the output of said discriminator in a manner to reduce said deviation.

3. In an oscillation generator comprising a crystal controlled source of radio frequency energy: means selecting and amplifying a harmonic of the frequency of the output of said source; a variable oscillator; ganged means for the simultaneous tuning of said harmonic selector and said variable oscillator, whereby a substantially constant difference is maintained between the frequencies of the outputs thereof; means mixing the outputs of said controlled source and said variable oscillator and deriving a signal having a frequency equal to the difference of the frequencies of said outputs; a frequency discriminator tunable over a range at least equal to the fundamental frequency of said controlled source, said discriminator having applied thereto the output of said mixing means; and means controlling the frequency of said variable oscillator in accordance with the output of said discriminator.

4. In an oscillation generator comprising a crystal controlled source of radio frequency energy: means selecting and amplifying a harmonic of the frequency of the output of said source; a variable oscillator; ganged means for the simultaneous tuning of said harmonic selector and said variable oscillator, whereby a substantially constant difference is maintained between the frequencies of the outputs thereof; and means for the further control of the frequency of the output of said variable oscillator; said means comprising means for mixing the outputs of said harmonic selector and said variable oscillator and deriving an output having a frequency equal to the difference in frequency of said mixed outputs; means having applied thereto said derived output and generating in response thereto a signal the amplitude of which is a function of the frequency of said mixer output; and means controlling the frequency of said variable oscillator in accordance with the amplitude and sense of said generated signal.

R. VERNON LINDNER.
ROBERT B. EDWARDS.

REFERENCES CITED

The following references are of record in the file of this patent:

UNITED STATES PATENTS

| Number | Name | Date |
|---|---|---|
| 1,847,160 | Affel | Mar. 1, 1932 |
| 1,931,873 | Marrison | Oct. 24, 1933 |
| 2,096,881 | Butler | Oct. 26, 1937 |
| 2,121,735 | Foster et al. | June 21, 1938 |
| 2,147,509 | Wilkens | Feb. 14, 1939 |
| 2,166,805 | Dome | July 18, 1939 |
| 2,177,713 | Granqvist | Oct. 31, 1939 |
| 2,207,934 | Mountjoy | July 16, 1940 |
| 2,210,781 | Shofstall | Aug. 6, 1940 |
| 2,230,588 | Cutting | Feb. 4, 1941 |
| 2,280,139 | Wheeler et al. | Apr. 21, 1942 |
| 2,369,663 | Dennis et al. | Feb. 20, 1945 |
| 2,406,125 | Ziegler | Aug. 20, 1946 |
| 2,407,863 | Ziegler | Sept. 17, 1946 |
| 2,425,922 | Crosby | Aug. 19, 1947 |